(12) United States Patent
Wang et al.

(10) Patent No.: US 11,693,296 B2
(45) Date of Patent: Jul. 4, 2023

(54) OPTICAL ELEMENT DRIVING MECHANISM AND OPTICAL SYSTEM

(71) Applicant: TDK TAIWAN CORP., Taoyuan (TW)

(72) Inventors: Chao-Hsi Wang, Taoyuan (TW);
Chao-Chang Hu, Taoyuan (TW);
Chih-Wei Weng, Taoyuan (TW);
He-Ling Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 192 days.

(21) Appl. No.: 16/898,786

(22) Filed: Jun. 11, 2020

(65) Prior Publication Data
US 2021/0026097 A1    Jan. 28, 2021

Related U.S. Application Data

(60) Provisional application No. 62/879,190, filed on Jul. 26, 2019.

(30) Foreign Application Priority Data

Feb. 3, 2020   (CN) .......................... 202020150558.9

(51) Int. Cl.
*G02B 27/64* (2006.01)
*G02B 7/08* (2021.01)
(Continued)

(52) U.S. Cl.
CPC .............. *G03B 13/36* (2013.01); *G01P 15/02* (2013.01); *G02B 7/04* (2013.01); *G02B 7/08* (2013.01);
(Continued)

(58) Field of Classification Search
CPC . G03B 13/36; G03B 5/00; G03B 5/02; G03B 2205/0007; G03B 2205/0069; G03B 2205/0076; G03B 3/02; G03B 3/10; G03B 30/00; G03B 3/00; G01P 15/02; G02B 7/04; G02B 7/08; G02B 7/09; G02B 27/646; G02B 7/282; H02K 33/18; H02K 41/0354; H02K 41/0356; H02K 41/035; H04N 5/2251; H04N 5/2252; H04N 5/2253; H04N 5/2254; H04N 5/2257; H04N 23/50;
(Continued)

(56) References Cited

U.S. PATENT DOCUMENTS 8,593,568 B2 *  11/2013  Topliss ................. H04N 5/2257
                                                            348/335
2006/0018646 A1 *  1/2006  Stavely ................. G03B 17/02
                                                            348/E5.046
(Continued)

*Primary Examiner* — Usman A Khan
(74) *Attorney, Agent, or Firm* — Muncy, Geissler, Olds & Lowe, P.C.

(57) ABSTRACT

An optical element driving mechanism is provided. The optical element driving mechanism includes a fixed part, a movable part, a driving assembly, and a positioning assembly. The movable part is movably disposed on the fixed part. The movable part is connected to an optical element. At least a portion of the driving assembly is disposed on the fixed part. The positioning assembly is disposed on the fixed part or the movable part to limit the movable part at an extreme position relative to the fixed part.

17 Claims, 8 Drawing Sheets

(51) Int. Cl.

| | |
|---|---|
| *G03B 5/00* | (2021.01) |
| *H02K 33/18* | (2006.01) |
| *G03B 13/36* | (2021.01) |
| *G02B 7/09* | (2021.01) |
| *G02B 7/04* | (2021.01) |
| *H02K 41/035* | (2006.01) |
| *G01P 15/02* | (2013.01) |
| *G03B 5/02* | (2021.01) |
| *H04N 23/50* | (2023.01) |
| *H04N 23/51* | (2023.01) |
| *H04N 23/54* | (2023.01) |
| *H04N 23/55* | (2023.01) |
| *H04N 23/57* | (2023.01) |

(52) U.S. Cl.
CPC ............ *G02B 7/09* (2013.01); *G02B 27/646* (2013.01); *G03B 5/00* (2013.01); *G03B 5/02* (2013.01); *H02K 33/18* (2013.01); *H02K 41/0354* (2013.01); *H02K 41/0356* (2013.01); *H04N 23/50* (2023.01); *H04N 23/51* (2023.01); *H04N 23/54* (2023.01); *H04N 23/55* (2023.01); *H04N 23/57* (2023.01); *G03B 2205/0007* (2013.01); *G03B 2205/0069* (2013.01); *G03B 2205/0076* (2013.01)

(58) Field of Classification Search
CPC ........ H04N 23/51; H04N 23/54; H04N 23/55; H04N 23/57; F03G 7/065
USPC ....................................................... 359/823
See application file for complete search history.

(56) References Cited

U.S. PATENT DOCUMENTS

| | | | | |
|---|---|---|---|---|
| 2006/0272328 | A1* | 12/2006 | Hara | G03B 5/00 60/527 |
| 2007/0279497 | A1* | 12/2007 | Wada | H04N 5/23248 348/208.99 |
| 2011/0069949 | A1* | 3/2011 | Huang | G03B 9/08 396/468 |
| 2011/0116783 | A1* | 5/2011 | Liu | G03B 9/14 310/156.43 |
| 2011/0122311 | A1* | 5/2011 | Han | H02K 41/0356 348/E3.007 |
| 2012/0229926 | A1* | 9/2012 | Wade | G02B 7/04 359/823 |
| 2015/0304561 | A1* | 10/2015 | Howarth | G02B 7/023 348/374 |

\* cited by examiner

OPTICAL ELEMENT DRIVING MECHANISM AND OPTICAL SYSTEM

CROSS-REFERENCE TO RELATED APPLICATIONS

This application claims the benefit of U.S. Provisional Application No. 62/879,190,filed on Jul. 26, 2019, and China Patent Application No.202020150558.9, filed on Feb. 3, 2020, which are incorporated by reference herein in their entirety.

BACKGROUND OF THE INVENTION

Field of the Invention

The present invention relates to an optical element driving mechanism and an optical system, and in particular it relates to an optical element driving mechanism and an optical system that may be used on electronic devices.

Description of the Related Art

As technology has developed, many of today's electronic devices (such as computers, tablet computers, and smartphones) are capable of capturing images and recording videos. The use of such electronic devices is getting popular. Additionally, designs for more convenient and thinner electronic devices is flourishing to provide more options to the users.

BRIEF SUMMARY OF THE INVENTION

An embodiment of the present invention provides an optical element driving mechanism. The optical element driving mechanism includes a fixed part, a movable part, a driving assembly, and a positioning assembly. The movable part is movably disposed on the fixed part. The movable part is connected to an optical element. At least a portion of the driving assembly is disposed on the fixed part. The positioning assembly is disposed on the fixed part or the movable part to limit the movable part at an extreme position relative to the fixed part.

According to some embodiments, the driving assembly includes a coil wound in a first direction. The driving assembly drives the movable part to move along the first direction. The positioning assembly and the coil are arranged along the first direction. The driving assembly includes a plurality of positioning elements disposed on different sides of the coil in the first direction. The driving assembly further includes a magnetically permeable element connected to the fixed part and a maximum size of the coil is less than a maximum size of the magnetically permeable element in the first direction. When viewed along the first direction, the coil is polygonal and includes a long side and a short side, wherein the long side is parallel with a second direction and the short side is parallel with a third direction.

According to some embodiments, the fixed part, the movable part, and the driving assembly are arranged along the third direction. When viewed along the third direction, the fixed part, the movable part, and the driving assembly at least partially overlap each other. The driving assembly further includes a magnetic element and magnetic poles of the magnetic element are arranged to be parallel with the third direction. The magnetic element includes a first surface facing away from the coil and the coil includes a second surface facing away from the magnetic element, and when viewed along the first direction, an end surface of the positioning assembly is located between the first surface and the second surface. The magnetic element includes a third surface facing the coil. When viewed along the first direction, the end surface of the positioning assembly is located between the first surface and the third surface.

According to some embodiments, the fixed part further includes a body and a cap. A portion of the optical element is revealed between the body and the cap when viewed along the second direction. The cap further includes a plurality of fixing structures and the fixing structures are disposed diagonally on the cap when viewed along the third direction. The body includes a hollow receiving portion for receiving the driving assembly. When viewed along the third direction, the receiving portion at least partially overlaps the magnetic element and the receiving portion at least partially overlaps the coil. The body includes a bottom surface facing away from the movable part and a portion of the positioning assembly is revealed from the bottom surface. The body further includes a light-transmitting portion corresponding to the optical element. The cap further includes a protrusion and the protrusion is located between the light-transmitting portion and the driving assembly when viewed along the second direction.

An embodiment of the present invention provides an optical system. The optical system includes an optical element driving mechanism, a first camera module, and a light path adjustment module. The optical element driving mechanism includes a fixed part, a movable part, a driving assembly, and a positioning assembly. The fixed part includes an opening corresponding to an optical element. The movable part is movably disposed on the fixed part and connected to the optical element. The driving assembly drives the optical element to move along a first direction. At least a portion of the driving assembly is disposed on the fixed part. The positioning assembly is disposed on the fixed part or the movable part to limit the movable part at an extreme position relative to the fixed part. The light path adjustment module correspondes to the first camera module. The light path adjustment module and the driving assembly are arranged along the first direction. The opening further corresponds to the light path adjustment module.

According to some embodiments, the light path adjustment module and the first camera module are arranged along a direction that is either parallel with or perpendicular to the first direction. The optical system further includes a second camera module. The light path adjustment module is disposed between the first camera module and the second camera module.

BRIEF DESCRIPTION OF THE DRAWINGS

The present invention may be more fully understood by reading the subsequent detailed description and examples with references made to the accompanying drawings.

DETAILED DESCRIPTION OF THE INVENTION

Figure 1:
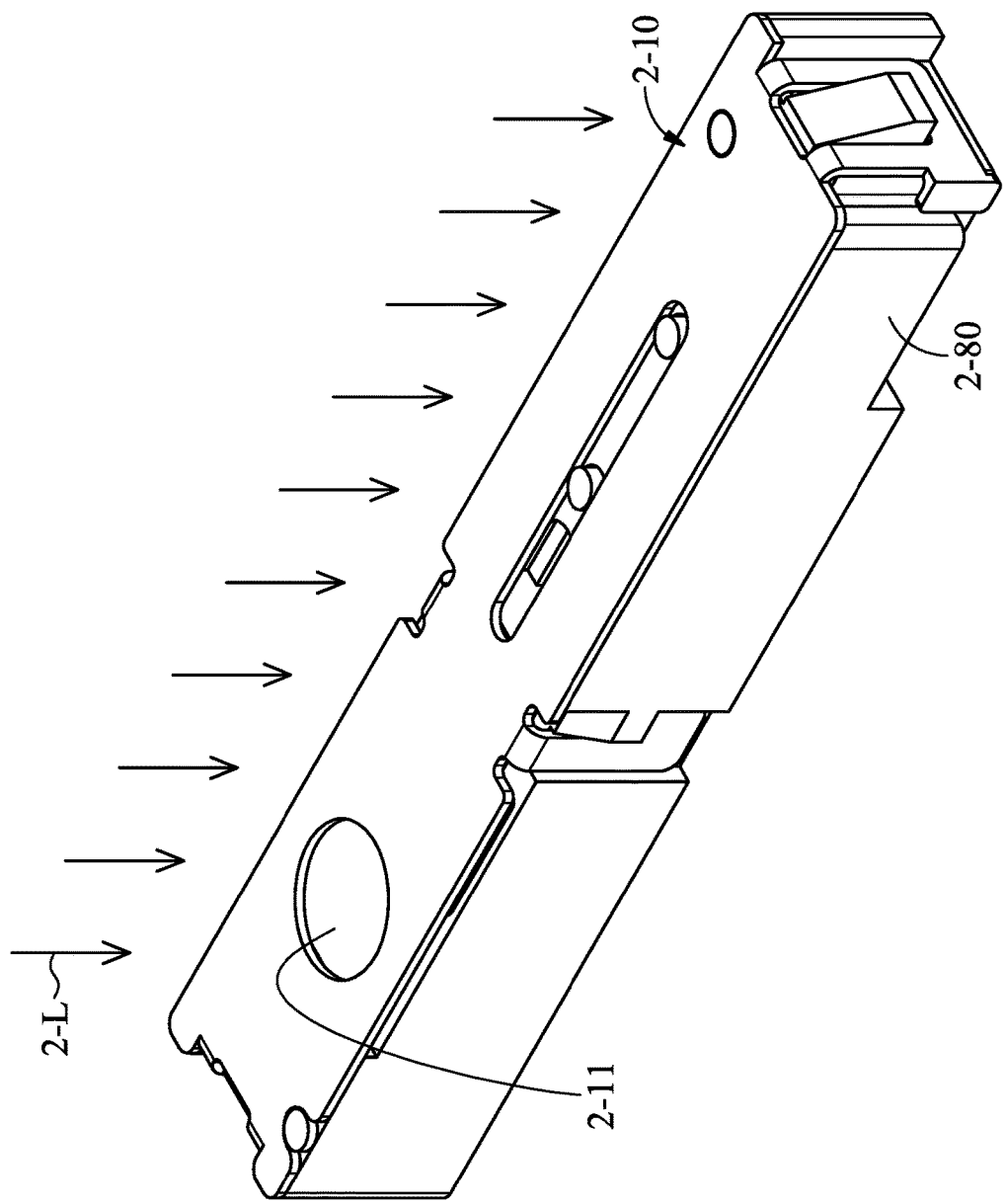
FIG. 1 is a perspective view of an optical element driving mechanism.

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of the present disclosure will be described here with the accompanying drawings. In the description, the coordinate axes shown in the drawings and the terms "a first direction (X-axis)", "a second direction (Y-axis)", and "a third direction (Z-axis) may be used. Here, the first direction (X-axis), the second direction (Y-axis), and the third direction (Z-axis) are perpendicular to each other, but it is not limited thereto.

Figure 2:
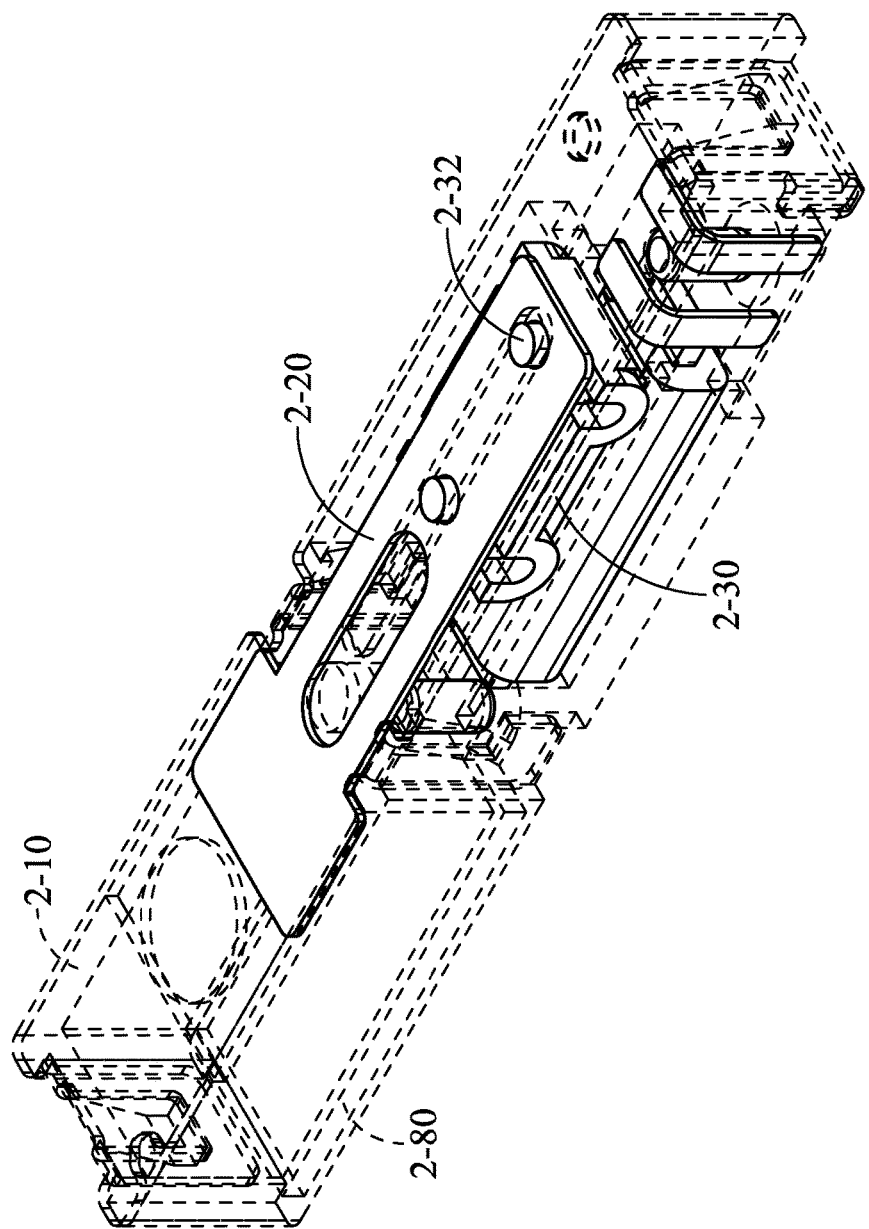
FIG. 2 is a perspective view of the optical element driving mechanism, and some elements are illustrated in dotted lines.
Figure 3:
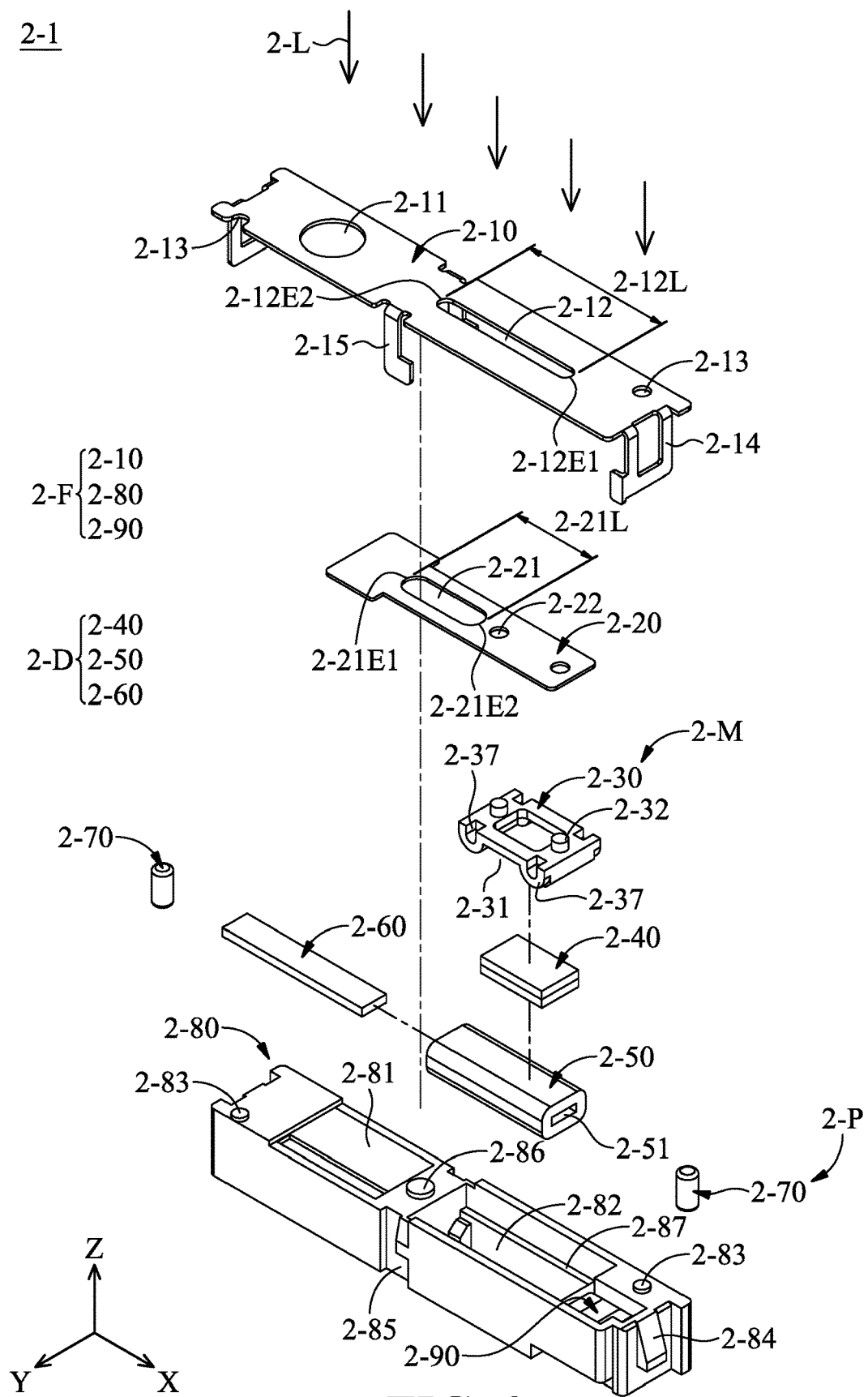
FIG. 3 is an exploded view of the optical element driving mechanism.

Please refer to FIG. 1 to FIG. 3 first. FIG. 1 is a perspective view of an optical element driving mechanism 2-1. FIG. 2 is a perspective view of the optical element driving mechanism 2-1, and some elements are illustrated in dotted lines. FIG. 3 is an exploded view of the optical element driving mechanism 2-1.

The optical element driving mechanism 2-1 includes a fixed part 2-F, a movable part 2-M, a driving assembly 2-D, and a positioning assembly 2-P. The fixed part 2-F, the movable part 2-M, and the driving assembly 2-D are arranged along the third direction (Z-axis). When viewed along the third direction (Z-axis), the fixed part 2-F, the movable part 2-M, and the driving assembly 2-D at least partially overlap.

The optical element driving mechanism 2-1 is used for driving an optical element 2-20 to move along a first direction (X-axis). The optical element 2-20 may be a light-shielding sheet, a blade, a filter, a light-reduction mirror, a polarizer, etc., for example, a SOMA light-shielding sheet. The optical element 2-20 includes a through hole 2-21 and at least one hole 2-22. The through hole 2-21 includes two edges 2-21E1, 2-21E2. The optical element 2-20 connects to the movable part 2-M via the hole 2-22. Specifically, the movable part 2-M is driven by the driving assembly 2-D, and thus the optical element 2-20 connected to the movable part 2-M is also driven, so that the optical element 2-20 may move along the first direction (X-axis) relative to the fixed part 2-F.

The fixed part 2-F includes a cap 2-10, a body 2-80, and an electrical connection portion 2-90. The cap 2-10 and the body 2-80 are arranged along the third direction (Z-axis). The cap 2-10 may be connected to the body 2-80 to form a cuboid or a cube. The electrical connection portion 2-90 may be made of any conductive material, such as copper. The electrical connection portion 2-90 is used for electrically connected to other devices.

The cap 2-10 includes an opening 2-11, a groove 2-12, at least one fixing structure 2-13, at least one connecting structure 2-14, and at least one protrusion 2-15. The body 2-80 includes a light-transmitting portion 2-81, a receiving portion 2-82, at least one fixing element 2-83, at least one connecting element 2-84, at least one concave portion 2-85, a stopping element 2-86 and at least one track 2-87.

The opening 2-11 of the cap 2-10 corresponds to the light-transmitting portion 2-81 of the body 2-80. The opening 2-11 allows a light 2-L to pass through. In this embodiment, the shape of the openings 2-11 is circular. However, the openings 2-11 may have other shapes. The groove 2-12 of the cap 2-10 is used for providing the space for the movable part 2-M and the optical element 2-20 connected to the movable part 2-M to move.

The groove 2-12 includes two edges 2-12E1, 2-12E2. The movement of the movable part 2-M and the optical element 2-20 may be stopped by the contact between the movable part 2-M and the edges 2-12E1, 2-12E2 of the groove 2-12. In addition, the movement of the movable part 2-M and the optical element 2-20 may be stopped by the contact between the stopping element 2-86 of the body 2-80 and the edges 2-21E1, 2-21E2 of the through hole 2-21 of the optical element 2-20. In some embodiments, the through hole 2-21 and the stopping element 2-86 may be omitted, and only the contact between the movable part 2-M and the edges 2-12E1, 2-12E2 of the groove 2-12 may be used to stop the movement of the movable part 2 -M and the optical element 2-20.

That is, a length 2-12L of the groove 2-12 of the cap 2-10 (i.e. the distance between the edge 2-12E1 and the edge 2-12E2) provides the space for the movable part 2-M and the optical element 2-20 to move in the groove 2-12. Additionally, a length 2-21L of the through hole 2-21 of the optical element 2-20 (i.e. the distance between the edge 2-21E1 and the edge 2-21E2) is the maximum distance that the movable part 2-M and the optical element 2-20 may move. The length 2-12L of the groove 2-12 is greater than the length 2-21 L of the through hole 2-21.

Figure 9:
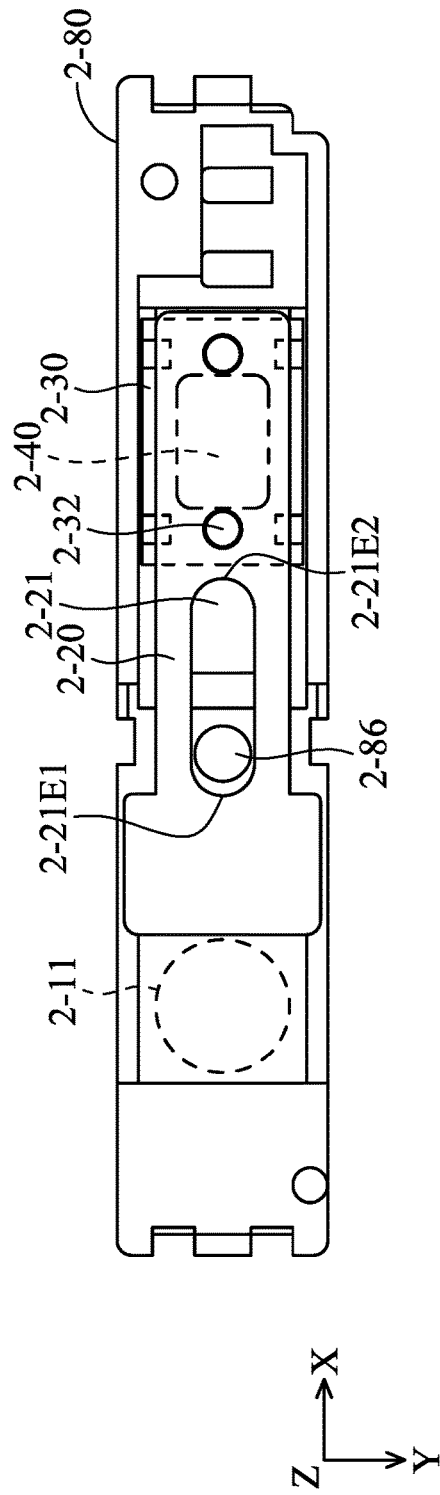
FIG. 9 and FIG. 10 are top views of the optical element driving mechanism.
Figure 10:
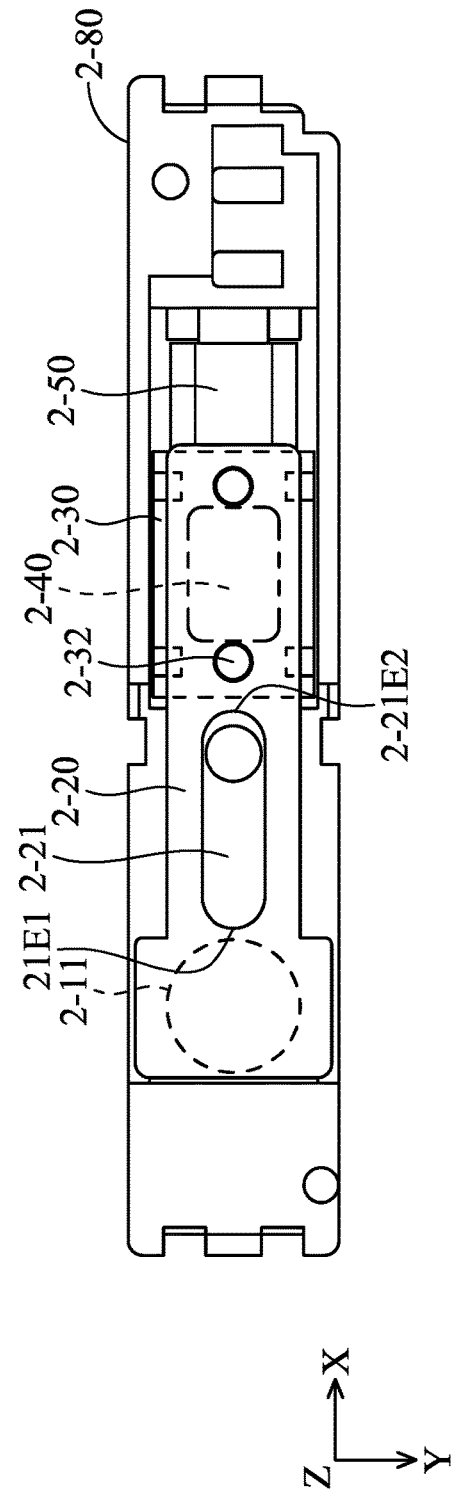

For clarity of illustration, in the present disclosure, the position where the movable part 2-M contacts the edge 2-12E1 of the groove 2-12 is referred to as a "first extreme position", and the position where the movable part 2-M contacts the edges 2-12E2 of the groove 2-12 is referred to as a "second extreme position". When the movable part 2-M is located at the first extreme position, the stopping element 2-86 of the body 2-80 contacts the edge 2-21E1 of the through hole 2-21 of the optical element 2-20. When the movable part 2-M is at the second extreme position, the stopping element 2-86 of the body 2-80 contacts the edge 21-E2 of the through hole 2-21 of the optical element 2-20 (as shown in FIG. 9 and FIG. 10).

The movement of the optical element 2-20 may control whether the light 2-L passes through the light-transmitting portion 2-81 or not. When the light 2-L passes through the opening 2-11 and is not blocked by the optical element 2-20 (for example, when the movable part 2-M is located at the first extreme position), the light 2-L may smoothly pass through the light-transmitting portion 2-81. When the light 2-L passes through the opening 2-11 and is blocked by the optical element 2-20 (for example, when the movable part 2-M is located at the second extreme position), i.e. the opening 2-11 and the light-transmitting portion 2-81 correspond to the optical element 2-20, the light 2-L cannot pass through the light-transmitting portion 2-81. Therefore, the movement of the optical element 2-20 may control the passage time of the light 2-L.

The fixing structure 2-13 of the cap 2-10 and the fixing element 2-83 of the body 2-80, the connecting structure 2-14 of the cap 2-10 and the connecting element 2-84 of the body 2-80, and the protrusion 2-15 of the cap 2-10 and the concave portion 2-85 of the body 2-80 may all have corresponding shapes to contribute to the connection between the cap 2-10 and the body 2-80.

In this embodiment, the fixing structure 2-13 is perforated. When viewed along the third direction (Z-axis), the two fixing structures 2-13 are respectively disposed on the diagonal of the top surface of the cap 2-10. The fixing element 2-83 is protuberant. The two fixing elements 2-83 are located on the diagonal of the top surface of the body 2-80. The fixing structures 2-13 may be engaged with the fixing elements 2-83. When viewed along the first direction (X-axis), the connecting structure 2-14 is a U-shaped hook extending from the edge of the top surface of the cap 2-10, the connecting element 2-84 is protuberant, and the connecting structure 2-14 may tightly surround the connecting element 2-84. Furthermore, the protrusion 2-15 is a L-shaped hook extending from the edge of the top surface of the cap 2-10, the concave portion 2-85 is L-shaped, and the protrusion 2-15 may be engaged with the concave portion 2-85.

The movable part 2-M includes a holder 2-30. In some embodiments, the movable part 2-M additionally includes an elastic element that facilitates the movement of the holder 2-30. The holder 2-30 is movably disposed on the receiving portion 2-82 of the body 2-80, that is, the movable part 2-M may move relative to the fixed part 2-F. The holder 2-30 includes a holding portion 2-31, at least one projection 2-32, and at least one sliding portion 2-37. The holding portion 2-31 is located on the bottom surface of the holder 2-30. The projection 2-32 is located on the top surface of the holder 2-30. The projection 2-32 may pass through the hole 2-22 of the optical element 2-20, so as to connect the optical element 2-20. That is, the movable part 2-M may connect the optical element 2-20. The connection methods of the optical element 2-20 and the movable part 2-M is not limited to this embodiment. The sliding portion 2-37 is disposed on the track 2-87 of the body 2-80 to facilitate the movement of the holder 2-30 inside the receiving portion 2-82. It should be noted that the sliding portion 2-37 may be wheel-shaped or have any shape that facilitates the movement of the holder 2-30. In some embodiments, the sliding portion 2-37 includes a plurality of balls.

The driving assembly 2-D includes a magnetic element 2-40, a coil 2-50, and a magnetically permeable element 2-60. The magnetic element 2-40, the coil 2-50, and the magnetically permeable element 2-60 are disposed in the receiving portion 2-82 of the body 2-80. The width of the upper portion of the receiving portion 2-82 is greater than the width of the lower portion of the receiving portion 2-82 to facilitate the arrangement of magnetically permeable element 2-60 inside the receiving portion 2-82. When viewed along the third direction (Z-axis), the magnetic element 2-40, the coil 2-50, and the magnetically permeable element 2-60 at least partially overlap the receiving portion 2-82. Specifically, the magnetic element 2-40 is disposed in the holding portion 2-31 of the holder 2-30, and the magnetically permeable element 2-60 is connected to the body 2-80 That is, at least a portion of the driving assembly 2-D is disposed on the fixed part 2-F.

The magnetic element 2-40 may be a permanent magnet, and the pair of magnetic poles (N-pole, S-pole) of the magnetic element 2-40 is arranged along the third direction (Z -axis). The coil 2-50 includes a winding space 2-51. The winding space 2-51 is formed by the coil 2-50 wound around the magnetic element 2-60 along the first direction (X-axis). The magnetic element 2-40 and the coil 2-50 are arranged along the third direction (Z-axis). The magnetically permeable element 2-60 is made of a magnetically permeable material, for example, a material having a high magnetic permeability such as a ferromagnetic material. The magnetically permeable element 2-60 is used for concentrating the magnetic force generated between the magnetic element 2-40 and the coil 2-50.

The positioning assembly 2-P and the coil 2-50 are arranged along the first direction (X-axis). The positioning assembly 2-P includes a plurality of positioning elements 2-70. The positioning element 2-70 may be disposed on the fixed part 2-F or the movable part 2-M. In this embodiment, there are two positioning elements 2-70, and the positioning elements 2-70 are disposed on the body 2-80. Additionally, the two positioning elements 2-70 are disposed on different sides of the coil 2-50 in the first direction (X-axis). The positioning element 2-70 is made of a magnetically permeable material. When the movable part 2-M moves to the first extreme position or the second extreme position, the magnetic element 2-40 disposed on the movable part 2-M gets closer to one of the positioning elements 2-70. The positioning element 2-70 made of magnetically permeable material may attract the magnetic element 2-40 so that the magnetic element 2-40 tends to locate at a position that is close to the positioning element 2-70. That is, the positioning assembly 2-P may limit the movable part 2-M to locate at the first extreme position or the second extreme position relative to the fixed part 2-F to achieve the positioning effects.

Figure 4:
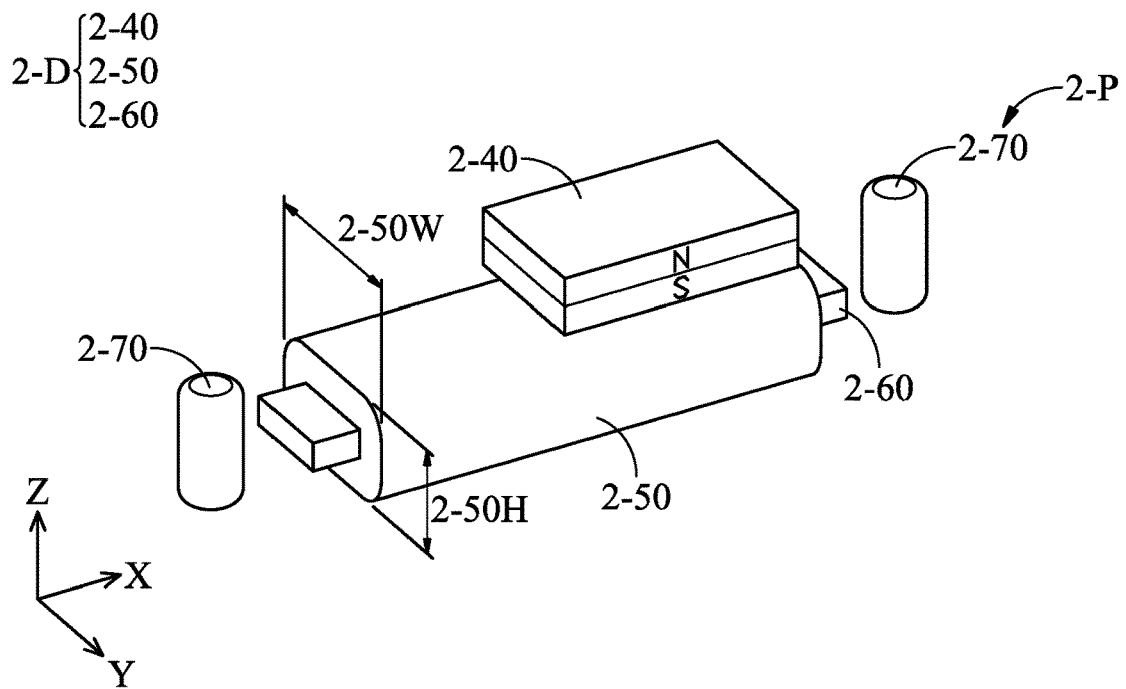
FIG. 4 is a schematic view of a driving assembly and a positioning assembly.
Figure 5:
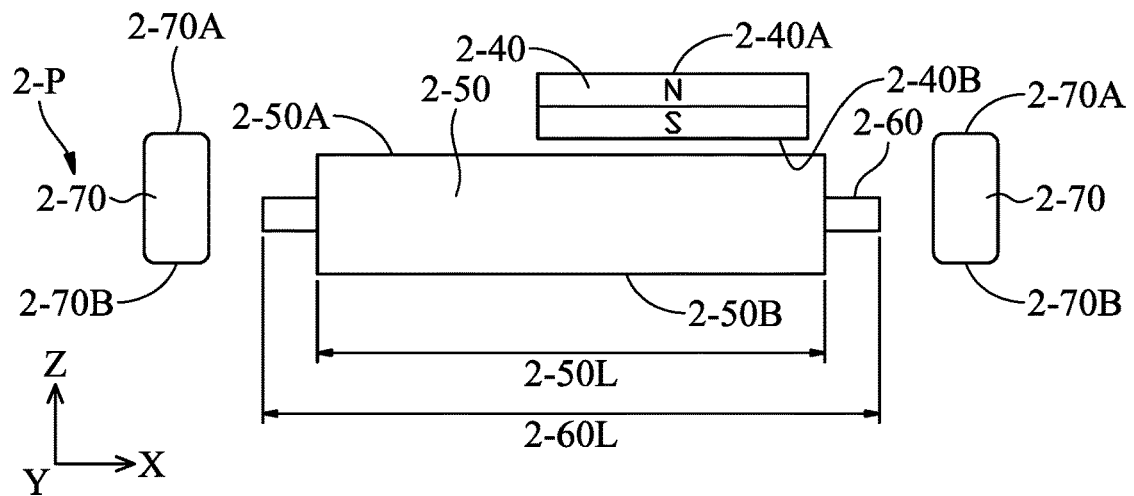
FIG. 5 is a side view of the driving assembly and the positioning assembly.

Next, please refer to FIG. 4 and FIG. 5 together to further understand the driving assembly 2-D and the positioning assembly 2-P. FIG. 4 is a schematic view of the driving assembly 2-D and the positioning assembly 2-P. FIG. 5 is a side view of the driving assembly 2-D and the positioning assembly 2-P.

Since the coil 2-50 is wound around the magnetic element 2-60 in the first direction (X-axis), a maximum size 2-50L of the coil 2-50 is less than a maximum size 2-60L of the magnetically permeable element 2-60 in the first direction (X-axis) to ensure that the coil 2-50 is tightly wound around the magnetic element 2-60.

The magnetic element 2-40 has a top surface 2-40 facing away from the coil 2-50 and a bottom surface 2-40B facing the coil 2-50. The coil 2-50 has a top surface 2-50A facing the magnetic element 2-40 and a bottom surface 2-50B facing away from the magnetic element 2-40.

When viewed along the first direction (X-axis), the coil 2-50 is polygonal, including a long side 2-50W and a short side 2-50H. The long side 2-50W is parallel with the second direction (Y-axis) and the short side 2-50H is parallel with the third direction (Z-axis). When the long side 2-50W faces the magnetic element 2-40, the top surface 2-50A of the coil 2-50 that faces the magnetic element 2-40 is larger and generates a greater magnetic force than when the short side 2-50H faces the magnetic element 2-40. Also, since the short side 2-50H is parallel with the height (Z-axis) of the optical element driving mechanism 2-1, the height of the coil 2-50 is shorter (i.e. the short side 2-50H is shorter than the long side 2-50W) than when the long side 2-50W is parallel with the height (Z-axis) of the optical element driving mechanism 2-1. Therefore, the overall height of the optical element driving mechanism 2-1 may be reduced to achieve miniaturization.

The driving assembly 2-D is actuated by supplying a current to the coil 2-50. When viewed along the first direction (X-axis), the current flows into the coil 2-50 clockwise or counterclockwise. Taking the top surface 2-50A of the coil 2-50 as an example, when viewed along the second direction (Y-axis), the current flowing through the top surface 2-50A is flowing into or out of the paper, and the direction of the magnetic field that the magnetic element 2-40 provides to the top surface 2-50A is in the third direction (Z-axis). According to the right-hand rule, which describes the relationship of current, magnetic field, and magnetic force, one may know that the generated magnetic force between the magnetic element 2-40 and the coil 2-50 is in the first direction (X-axis) and thus the magnetic element 2-40 may move along the first direction (X-axis). In some embodiments, a slider (not shown) may be additionally provided between the magnetic element 2-40 and the coil 2-50 to facilitate the movement of the magnetic element 2-40.

The movement of the magnetic element 2-40 along the first direction (X-axis) may make the holder 2-30 as well as the optical element 2-20 connected to the holder 2-30 move along the first direction (X-axis). That is, the driving assembly 2-D may drive the holder 2-30 and the optical element 2-20 connected to the holder 2-30 to move along the first direction (X-axis).

As described above, the magnetic force generated by the driving assembly 2-D is generated between the bottom surface 2-40B of the magnetic element 2-40 and the top surface 2-50A of the coil 2-50. In order to make the positioning element 2-70 effectively attract the magnetic element 2-40, an end surface (the top surface) 2-70A of the positioning element 2-70 is generally higher than the bottom surface 2-40B of the magnetic element 2-40 in the third direction (Z-axis), and the other end surface 2-70B (the bottom surface) is usually lower than the top surface 2-50A of the coil 2-50 in the third direction (Z-axis).

In some embodiments, when viewed along the first direction (X-axis), the end surface 2-70A of the positioning element 2-70 is located between the top surface 2-40A of the magnetic element 2-40 and the bottom surface 2-50B of the coil 2-50. In some embodiments, when viewed along the first direction (X-axis), the end surface 2-70A of the positioning element 2-70 is located between the top surface 2-40A of the magnetic element 2-40 and the bottom surface 2-40B of the magnetic element 2-40.

In some embodiments, when viewed along the first direction (X-axis), the end surface 2-70B of the positioning element 2-70 is located between the top surface 2-50A of the coil 2-50 and the bottom surface 2-50B of the coil 2-50. In some other embodiments, when viewed along the first direction (X-axis), the end surface 2-70B of the positioning element 2-70 exceeds the bottom surface 2-50B of the coil 2-50 and thus is closer to the bottom surface 2-80B of the body 2-80 that faces away from the movable part 2-M.

Figure 6:
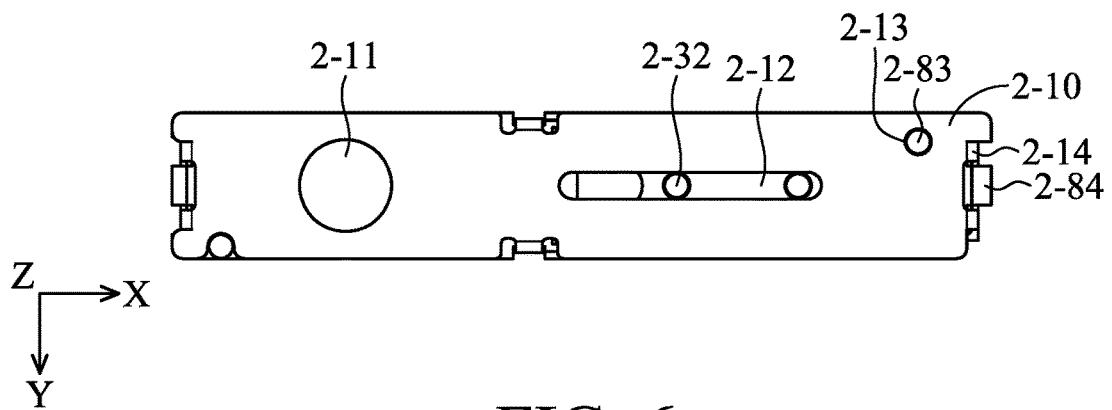
FIG. 6 is a top view of the optical element driving mechanism.
Figure 7:
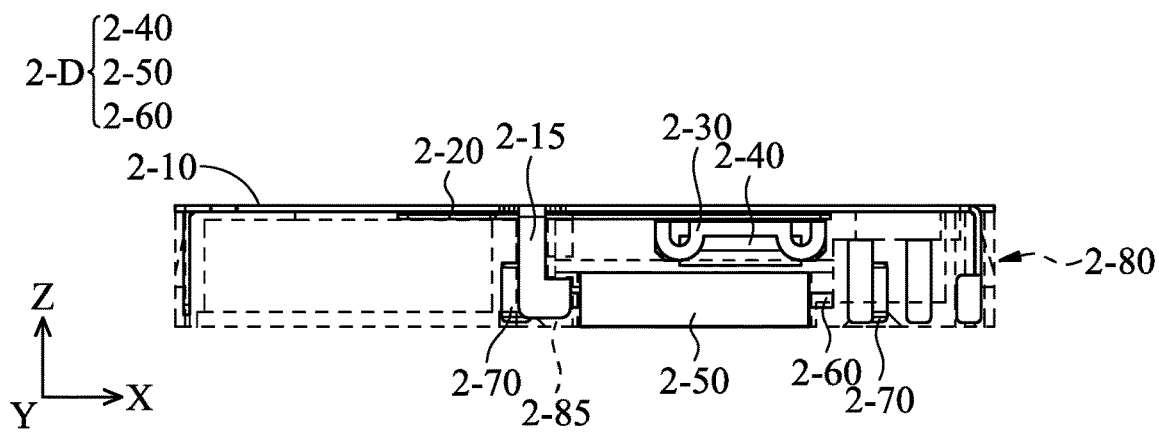
FIG. 7 is a side view of the optical element driving mechanism.
Figure 8:
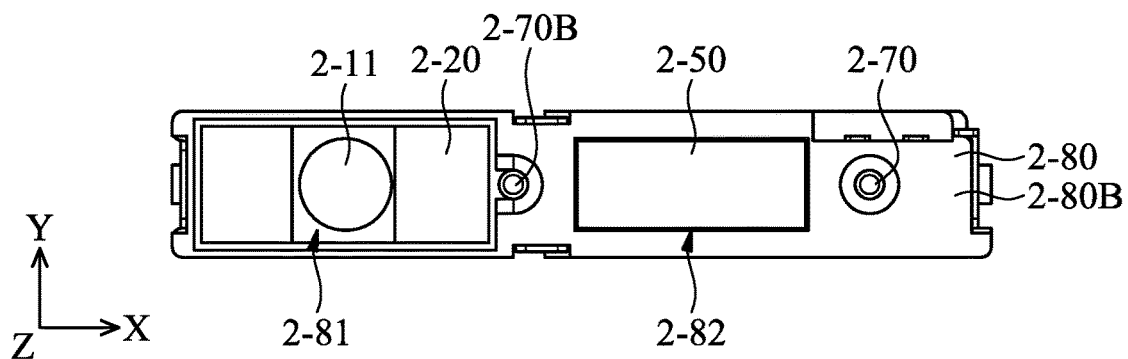
FIG. 8 is a bottom view of the optical element driving mechanism.

Next, how the optical element driving mechanism 2-1 is manufactured and assembled will be described with reference to FIG. 6 to FIG. 8. FIG. 6 is a top view of the optical element driving mechanism 2-1. FIG. 7 is a side view of the optical element driving mechanism 2-1. FIG. 8 is a bottom view of the optical element driving mechanism 2-1.

When manufacturing the optical element driving mechanism 2-1, the body 2-80 may be manufactured by plastic injection molding. Additionally, the positioning element 2-70 may be formed in the body 2-80 by insert molding so that the end surface 2-70B of the positioning element 2-70 is revealed from the bottom surface 2-80B of the body 2-80. Alternatively, a space for placing the positioning element 2-70 may be reserved when the body 2-80 is formed, and then the positioning element 2-70 may be placed manually or mechanically.

When assembling the optical element driving mechanism 2-1, the coil 2-50 is wound around the magnetically permeable element 2-60 and the magnetically permeable element 2-60 is mounted to the receiving portion 2-82 of the body 2-80, and the coil 2-50 is revealed from the side of the receiving portion 2-82 that faces away from the movable part 2-M. Next, the magnetic element 2-40 is affixed to the holding portion 2-31 of the holder 2-30, and the optical element 2-20 is mounted to the projection 2-32 of the holder 2-30. Next, the optical element 2-20, the holder 2-30, and the magnetic element 2-40 connected to one another are mounted to the receiving portion 2-82 of the body 2-80. As shown in FIG. 7, when viewed along the second direction (Y-axis), a portion of the optical element 2-20 is revealed between the cap 2-10 and the body 2-80.

Finally, the cap 2-10 is covered, and the projection 2-32 of the holder 2-30 may smoothly slide inside the groove 2-12 of the cap 2-10. When viewed along the second direction (Y-axis), the protrusion 2-15 is located between the light-transmitting portion 2-81 and the driving assembly 2-D.

It should be noted that an adhesion element may be provided depends on the situation. The adhesion element may be an adhesive material, such as glue. For example, to strengthen the connection between the cap 2-10 and the body 2-80, the adhesion element may be applied between the fixing structure 2-13 and the fixing element 2-83, between the connecting structure 2-14 and the connecting element 2-84, or between the protrusion 2-15 and the concave portion 2-85. Alternatively, to strengthen the connection between the elements to each other, the adhesion element may be applied between the holder 2-30 and the magnetic element 2-40, between the magnetic element 2-60 and body 2-80, and the like. Alternatively, to prevent dust and particles from entering the optical element driving mechanism 2-1, the adhesion element may be applied between the coil 2-50 revealed from the receiving portion 2-82 and the body 2-80.

As described above, when the holder 2-30 moves to and from in the first direction (X-axis), the magnetic element 2-40 on the holder 2-30 is attracted by the two positioning elements 2-70. As a result, the holder 2-30 tends to be located at the first extreme position or the second extreme position. FIG. 9 and FIG. 10 are top views of the optical element driving mechanism 2-1, illustrating the holder 2-30 is located at the first extreme position and the second extreme position, respectively. In FIG. 9 and FIG. 10, the cap 2-10 is not shown, but the position of the opening 2-11 of the cap 2-10 is shown in dashed lines.

As shown in FIG. 9, when the holder 2-30 is located at the first extreme position, the opening 2-11 is not blocked by the optical element 2-20. As shown in FIG. 10, when the holder 2-30 is located at the second extreme position, the opening 2-11 is completely blocked by the optical element 2-20. In other words, in the present disclosure, the optical element 2-20 tends to change in the two situations in which the opening 2-11 is completely blocked and the opening 2-11 is not blocked. As a result, the opening 2-11 is partially blocked by a portion of the optical element 2-20 is less likely to happen, which is advantageous for controlling the passage time of the light 2-L.

Therefore, the optical element driving mechanism 2-1 may be associated with other optical modules (such as a camera module) to form an optical system, so that the combination of the optical element driving mechanism 2-1 and the optical element 2-20 may be used as a shutter or block the optical module when the optical module is not in use.

Figure 11:
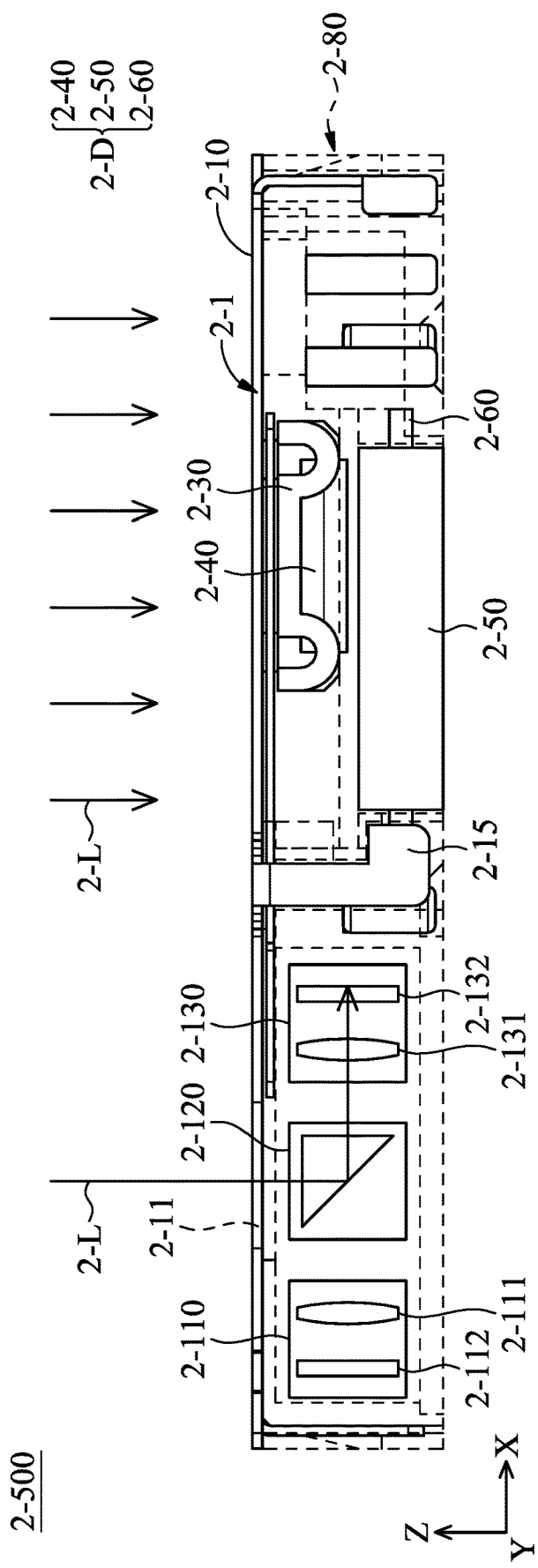
FIG. 11 is a schematic view of an optical system.

FIG. 11 is a schematic view of an optical system 2-500. The optical system 2-500 includes the optical element driving mechanism 2-1, a first camera module 2-110, a light path adjustment module 2-120, and a second camera module 2-130. The light path adjustment module 2-120 and the driving assembly 2-D are arranged along the first direction (X-axis). The light path adjustment module 2-120 is disposed between the first camera module 2-110 and the second camera module 2-130. In some embodiments, the optical system 2-500 may include one or more camera modules and the light path adjustment module may be omitted. For example, a camera module may be directly provided under the opening 2-11 and the light path adjustment module 2-120 may be omitted.

The first camera module 2-110 includes a first lens 2-111 and a first photosensitive element 2-112, and the light 2-L passing through the first lens 2-111 may be imaged on the first photosensitive element 2-112. The second camera module 2-130 includes a second lens 2-131 and a second photosensitive element 2-132. The light 2-L passing through the second lens 2-131 may be imaged on the second photosensitive element 2-132. The light path adjustment module 2-120 includes an light path adjustment element 2-121. The light path adjustment element 2-121 may be a prism, a lens, and the like. The light path adjustment element 2-121 may change the direction of the light 2-L.

The opening 2-11 corresponds to the light path adjustment module 2-120. The light path adjustment module 2-120 corresponds to the first camera module 2-110 and the second camera module 2-130. In FIG. 11, the direction of the light 2-L is changed from parallel with the third direction (Z-axis) to parallel with the first direction (X-axis) and then the light 2-L enters into the second camera module 2-130. However, the light path adjustment element 2-121 may also be rotated (for example, around the second direction (Y-axis) as a rotation axis), so that light 2-L enters into the first camera module 2-110. In addition, the focal length of the first lens 2-111 may be different than that of the second lens 2-131. That is, one of the first camera module 2-110 and the second camera module 2-130 with different focal lengths may be selected to conduct shooting. In addition, the focal lengths of the first lens 2-111 and the second lens 2-131 may be different. In other words, through the light path adjustment module 2-120, one of the first camera module 2-110 and the second camera module 2-130 with different focal lengths may be selected for shooting. Therefore, the zoom function is achieved by switching to the first camera module 2-110 or the second camera module 2-130.

Figure 12:
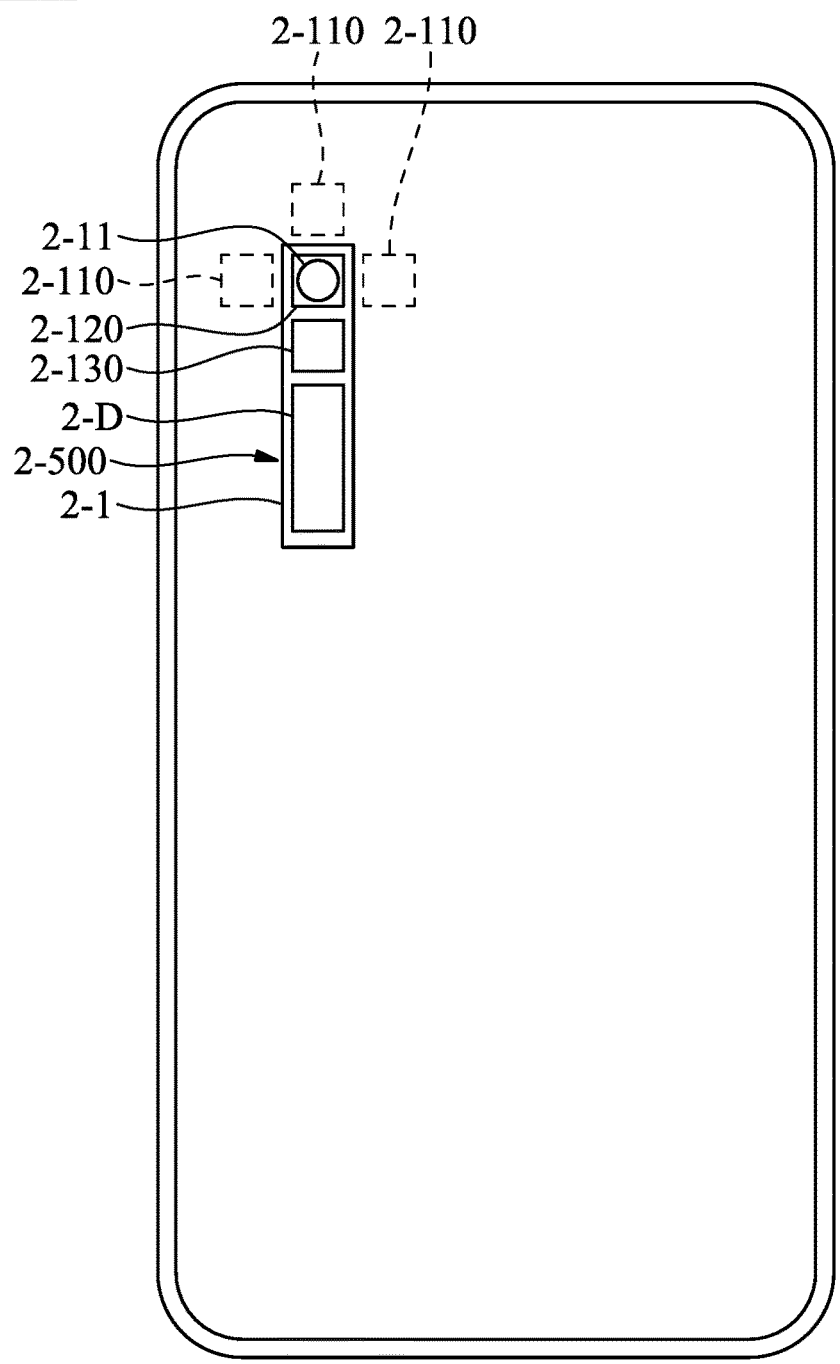
FIG. 12 is a schematic view of an electronic device equipped with the optical system.

FIG. 12 is a schematic view of an electronic device 2-600 equipped with the optical system 2-500. The electronic device 2-600 may be a computer, a tablet computer, a smart phone, and the like. In FIG. 12, each module is drawn in a simplified way, and the possible positions of the first camera module 2-110 are shown with dashed lines. As described above, the arrangement direction of the light path adjustment module 2-120 and the driving assembly 2-D is the first direction. In this embodiment, the light path adjustment module 2-120 and the first camera module 2-110 may be arranged along a direction that is either parallel with or perpendicular to the first direction. However, the arrangement of the light path adjustment module 2-120 and the first camera module 2-110 is not limited thereto. In addition to placing the optical system 2-500 on the corner of the electronic device 2-600, the optical system 2-500 may be placed on the side of the electronic device 2-600.

An optical element driving mechanism and an optical system are provided. The optical element driving mechanism may be associated with a camera module to capture an image. The optical element driving mechanism used as a shutter may properly control the passage time of the light. By the positioning assembly, when the user chooses to open or close the shutter, the situation where the shutter is half open or half closed may be avoided. Furthermore, the overall height of the optical element driving mechanism may be reduced by the arrangement of the coil to achieve miniaturization.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
    a fixed part;
    a movable part movably disposed on the fixed part and connected to an optical element;
    a driving assembly, wherein at least a portion of the driving assembly is disposed on the fixed part; and
    a positioning assembly disposed on the fixed part or the movable part to limit the movable part at an extreme position relative to the fixed part;
    wherein the driving assembly comprises a magnetically permeable element and a coil wound around the magnetically permeable element in a first direction;

wherein the driving assembly drives the movable part to move along the first direction;

wherein when viewed along the first direction, the coil is polygonal, comprising a long side that is parallel with a second direction and a short side that is parallel with a third direction;

wherein the fixed part further comprises a body and a cap, and a portion of the optical element is revealed between the body and the cap when viewed along the second direction.

2. The optical element driving mechanism as claimed in claim 1, wherein the positioning assembly and the coil are arranged along the first direction.

3. The optical element driving mechanism as claimed in claim 2, wherein the positioning assembly comprises a plurality of positioning elements disposed on different sides of the coil in the first direction.

4. The optical element driving mechanism as claimed in claim 1, wherein the magnetically permeable element is connected to the fixed part, and a maximum size of the coil is less than a maximum size of the magnetically permeable element in the first direction.

5. The optical element driving mechanism as claimed in claim 1, wherein the fixed part, the movable part, and the driving assembly are arranged along the third direction, and when viewed along the third direction, the fixed part, the movable part, and the driving assembly at least partially overlap each other.

6. The optical element driving mechanism as claimed in claim 1, wherein the driving assembly further comprises a magnetic element, and magnetic poles of the magnetic element are arranged to be parallel with the third direction.

7. The optical element driving mechanism as claimed in claim 6, wherein the magnetic element comprises a first surface facing away from the coil, the coil comprises a second surface facing away from the magnetic element, and when viewed along the first direction, an end surface of the positioning assembly is located between the first surface and the second surface.

8. The optical element driving mechanism as claimed in claim 7, wherein the magnetic element comprises a third surface facing the coil, and when viewed along the first direction, the end surface of the positioning assembly is located between the first surface and the third surface.

9. The optical element driving mechanism as claimed in claim 1, wherein the cap further comprises a plurality of fixing structures, and the fixing structures are disposed diagonally on the cap when viewed along the third direction.

10. The optical element driving mechanism as claimed in claim 1, wherein the body comprises a hollow receiving portion for receiving the driving assembly.

11. The optical element driving mechanism as claimed in claim 10, wherein the driving assembly further comprises a magnetic element, when viewed along the third direction, the receiving portion at least partially overlaps the magnetic element and the receiving portion at least partially overlaps the coil.

12. The optical element driving mechanism as claimed in claim 1, wherein the body comprises a bottom surface facing away from the movable part and a portion of the positioning assembly is revealed in the bottom surface.

13. The optical element driving mechanism as claimed in claim 1, wherein the body further comprises a light-transmitting portion corresponding to the optical element.

14. The optical element driving mechanism as claimed in claim 13, wherein the cap further comprises a protrusion and the protrusion is located between the light-transmitting portion and the driving assembly when viewed along the second direction.

15. An optical system, comprising:
an optical element driving mechanism, comprising:
a fixed part comprising an opening corresponding to an optical element;
a movable part movably disposed on the fixed part and connected to the optical element;
a driving assembly driving the movable part and the optical element to move along a first direction, wherein at least a portion of the driving assembly is disposed on the fixed part, and the driving assembly comprises a magnetically permeable element and a coil wound around the magnetically permeable element in the first direction; and
a positioning assembly disposed on the fixed part or the movable part to limit the movable part at an extreme position relative to the fixed part;
a first camera module; and
a light path adjustment module corresponding to the first camera module, wherein the light path adjustment module and the driving assembly are arranged along the first direction;
wherein the opening further corresponds to the light path adjustment module.

16. The optical system as claimed in claim 15, wherein the light path adjustment module and the first camera module are arranged along a direction that is either parallel with or perpendicular to the first direction.

17. The optical system as claimed in claim 15, further comprising a second camera module, wherein the light path adjustment module is disposed between the first camera module and the second camera module.

* * * * *